(12) United States Patent
Li et al.

(10) Patent No.: US 11,709,462 B2
(45) Date of Patent: Jul. 25, 2023

(54) SAFE AND EFFICIENT TRAINING OF A CONTROL AGENT

(71) Applicant: ADOBE INC., San Jose, CA (US)

(72) Inventors: Haoxiang Li, San Jose, CA (US); Yinan Zhang, West Lebanon, NH (US)

(73) Assignee: ADOBE INC., San Jose, CA (US)

( * ) Notice: Subject to any disclaimer, the term of this patent is extended or adjusted under 35 U.S.C. 154(b) by 1566 days.

(21) Appl. No.: 15/894,688

(22) Filed: Feb. 12, 2018

(65) Prior Publication Data
US 2019/0250568 A1    Aug. 15, 2019

(51) Int. Cl.
| | |
|---|---|
| G05B 13/02 | (2006.01) |
| G05B 17/02 | (2006.01) |
| G06N 3/08 | (2023.01) |
| G06N 20/00 | (2019.01) |

(52) U.S. Cl.
CPC .......... *G05B 13/027* (2013.01); *G05B 17/02* (2013.01); *G06N 3/08* (2013.01); *G06N 20/00* (2019.01)

(58) Field of Classification Search
CPC ........ G05B 13/027; G05B 17/02; G06N 3/08; G06N 20/00; G06N 3/006; G06N 3/0454; G06N 7/005
See application file for complete search history.

(56) References Cited

U.S. PATENT DOCUMENTS

2017/0213150 A1*   7/2017   Arel .................... G06N 3/0427

* cited by examiner

Primary Examiner — Tejal Gami

(74) Attorney, Agent, or Firm — Shook, Hardy & Bacon LLP

(57) ABSTRACT

The training of a learning agent to provide real-time control of an object is disclosed. Training of the learning agent and training of a corresponding pioneer agent are iteratively alternated. The training of the learning and pioneer agents is under the supervision of a supervisor agent. The training of the learning agent provides feedback for subsequent training of the pioneer agent. The training of the pioneer agent provides feedback for subsequent training of the learning agent. During the training, a supervisor coefficient modulates the influence of the supervisor agent. As agents are trained, the influence of the supervisor agent is decayed. The training of the learning agent, under a first level of supervisor influence, includes real-time control of the object. The subsequent training of the pioneer agent, under a reduced level of supervisor influence, includes replay of training data accumulated during the real-time control of the object.

7 Claims, 10 Drawing Sheets

1: Randomly initialize critic $Q(s, a|\theta^Q)$, actor $\mu_a(s|\theta^\mu)$ and pioneer $\mu_p(s|\theta^\mu_{t_2})$ networks.
2: Initialize target network $Q'$ and $\mu'_a$ with parameters $\theta^{Q'} \leftarrow \theta^Q$ and $\theta^{\mu'} \leftarrow \theta^\mu$
3: Initialize replay buffer $R$ and $R_p$
4: Initialize pioneer buffer threshold $r_p$
5: Initialize $k \leftarrow 1$
6: for episode = 1 to M do
7:     Initialize a random process $\mathcal{N}$ for exploration.
8:     Re-initialize the learning network $\theta^\mu \leftarrow \theta^\mu_{t_2}$
9:     Initialize temporary buffer $R_c$
10:     Reset environment and receive initial observation state $s_1$.
11:     for t = 1, T do
12:         Select action $a_t = \mu(s|\theta^\mu)$ and execute
13:         Observe reward $r_t$ and new state $s_{t+1}$
14:         Store transition $(s_t, a_t, r_t, s_{t+1})$ in $R$ and $R_c$
15:         Sample N transitions $(s_i, a_i, r_i, s_{i+1})$ from $R$
16:         Set $y_i = r_i + \gamma Q'(s_{i+1}, \mu'(s_{i+1})|\theta^{Q'})$
17:         Update critic by minimizing loss:
18:             $L = \frac{1}{N}\sum_i(y_i - Q(s_i, a_i|\theta^Q))$
19:         Update the actor using sampled policy gradient:
20:         $\nabla_{\theta^\mu} J \approx \frac{1}{N}\{(1-k)\sum_i \nabla_a Q(s_i, a_i)\nabla_{\theta^\mu}\mu_a(s_i)$
21:             $+ k\sum_i[\mu(s_i) - a_i]\}$
22:         Update the target networks:
23:             $\theta^{Q'} = \tau\theta^Q + (1-\tau)\theta^{Q'}$
24:             $\theta^{\mu'} = \tau\theta^\mu + (1-\tau)\theta^{\mu'}$
25:     if episode total reward $\geq r_p$ then
26:         Move transitions from $R_c$ to $R_p$
27:         Copy the learning network to pioneer: $\theta^\mu_{t_2} \leftarrow \theta^\mu$
28:         Sample transaction $(s_j, a_j, r_j, s_{j+1})$ from $R_p$
29:         Update the pioneer policy by applying gradient:
30:             $\nabla_{\theta^\mu_{t_2}} J_p = \sum_j[\mu_p(s_j|\theta^\mu_{t_2}) - a_j]$
31:     Empty $R_c$
32:     Decrease $k$
33:     Increase $r_p$

FIG. 6

SAFE AND EFFICIENT TRAINING OF A CONTROL AGENT

BACKGROUND

Control methods are employed to provide the automatic and real-time control of (real or virtual) objects or systems embedded within (real, augmented, or virtual) environments. For instance, a control system may be employed to automatically control a robot, performing one or more tasks within an environment. Many conventional control methods include manually designed models that are specific to a particular task and/or a particular environment, i.e., a manually designed model may not be generalizable to an arbitrary task and/or environment. That is, if the task or the environment is varied, such conventional control methods may be insufficient. Resultantly, the robot may fail to perform the task safely and/or successfully.

In contrast to manually designed control methods, conventional deep learning has been somewhat successful at automating the performance of certain classes of generalizable tasks, such as machine vision. For instance, deep learned neural networks can enable robots to recognize and detect objects within their environment. However, conventional deep learning requires significant amounts of training data. The training data is (often manually) curated with ground-truths. For many interesting tasks, a robot may need to do more than detect or recognize objects. For example, a robot may need to sense a state of their environment and/or position within the environment. The robot (or the robot's control agent) may then choose, based on an expected reward indicating progress or regress of successfully performing the task, an appropriate action to execute. For many such tasks, the number of possible environmental state-action pairs frequently becomes too large to address practically via conventional deep learning techniques that require labeled training data. That is, the size of the required curated training data set is too large to generate practically. Furthermore, the time to compute a deep neural network that adequately handles the large number of possible state-action pairs would be too large to prove viable.

Conventional reinforcement learning techniques, which enable the exploration of at least partially unknown environmental state spaces, state-action pairs, and corresponding rewards, have proved viable for certain classes of tasks and/or environments. However, for tasks and/or environments that include large and/or continuous state and/or action spaces, the computation time for adequate exploration may be unwieldy. Furthermore, especially in the early stages of learning, exploring the consequences of possible actions often generates catastrophic failures or hazardous/costly errors. For instance, a control system learning to fly, stabilize, and land an aerial drone via conventional reinforcement learning may, at least in the early stages of learning, more often than not crash and/or damage the drone. Such early failures may cause costly hardware damage, or even endanger the safety of individuals and/or structures in proximity to the drone's air space.

Some conventional reinforcement learning techniques have employed an expert policy during the training of a control system. The expert policy may return an optimal action based on an inputted environmental state. The control system may learn to return actions based on the responses of the expert policy. However, in many scenarios, an expert policy for the given task and/or environment is not available. Furthermore, such conventional techniques are slow to converge and are often unable to train an agent to perform better than an often-imperfect expert policy.

Other conventional methods include training a control agent in a simulated environment to avoid costly errors during the training period. However, developing a simulated environment that adequately represents the complexities of a physical environment with enough detail and precision to train the control agent adequately to avoid such costly errors is often challenging. Even with a significant amount of development effort, differences between the simulated environment and a physical environment may be too great to mitigate costly training errors. Furthermore, the computational time required to train a control agent in a simulated environment may be unacceptably large.

In attempts to avoid costly training errors, other conventional methods decrease the speed and/or magnitude of the actions of the controlled object. As the control agent is trained, the speed and/or magnitude of the actions of the controlled object is increased. However, such conventional methods have failed to converge to safe, effective, and successful control agents within acceptable training times.

SUMMARY

The present invention is directed towards training a learning agent to provide real-time control of an object or system, embedded in an environment, in the performance of a task. That is, the learning agent is safely and efficiently trained as a control agent. In the embodiments, training of the learning agent and training of a corresponding pioneer agent are iteratively alternated. The training of the learning and pioneer agents is under the supervision of a supervisor agent. The training of the learning agent provides feedback for subsequent training of the pioneer agent. Similarly, the training of the pioneer agent provides feedback for the subsequent training of the learning agent. During the training of the agents, a supervisor coefficient modulates the influence of the supervisor agent. As each of the learning and pioneer agents is iteratively trained (and converge towards less error-prone and more successful control agents), the influence of the supervisor agent on the training process is decayed via the reduction of the supervisor coefficient. The training of the learning agent, under a first level of supervisor influence, may involve the real-time control of the object. In contrast, the subsequent training of the pioneer agent, under a reduced level of supervisor influence, includes the replay of training data accumulated during the real-time control of the object.

More specifically, the learning agent may be initially trained based on a first combination signal that includes a learning signal generated by the learning agent and a supervisor signal generated by a supervisor agent. During the training of the learning agent, the first combined signal is used to control, in real-time, the object in the performance of the task. A supervisor coefficient weights the combination of the learning signal and the supervisor signal. During training iterations of the learning agent, training data is accumulated. After this initial training of the learning agent terminates, a pioneer agent is updated to include a learning policy of the trained learning agent. The supervisor coefficient is reduced. The pioneer agent may then be trained based on the training data accumulated during the previous training of the learning agent. The training of the pioneer agent may be further based on a second combined signal. The second combined signal includes a combination of the supervisor signal and a pioneer signal generated by the pioneer agent. The second combined signal is weighted by the reduced supervisor coefficient. After this training of the pioneer agent terminates, the learning agent is updated to include a pioneer policy of the trained pioneer agent. The updated learning agent may then be re-trained, via the reduced supervisor coefficient.

BRIEF DESCRIPTION OF THE DRAWINGS

FIG. 6 illustrates pseudo-code that implements various portions of processes 400 and 500 of FIGS. 4 and 5 respectively.

DETAILED DESCRIPTION

Figure 1:
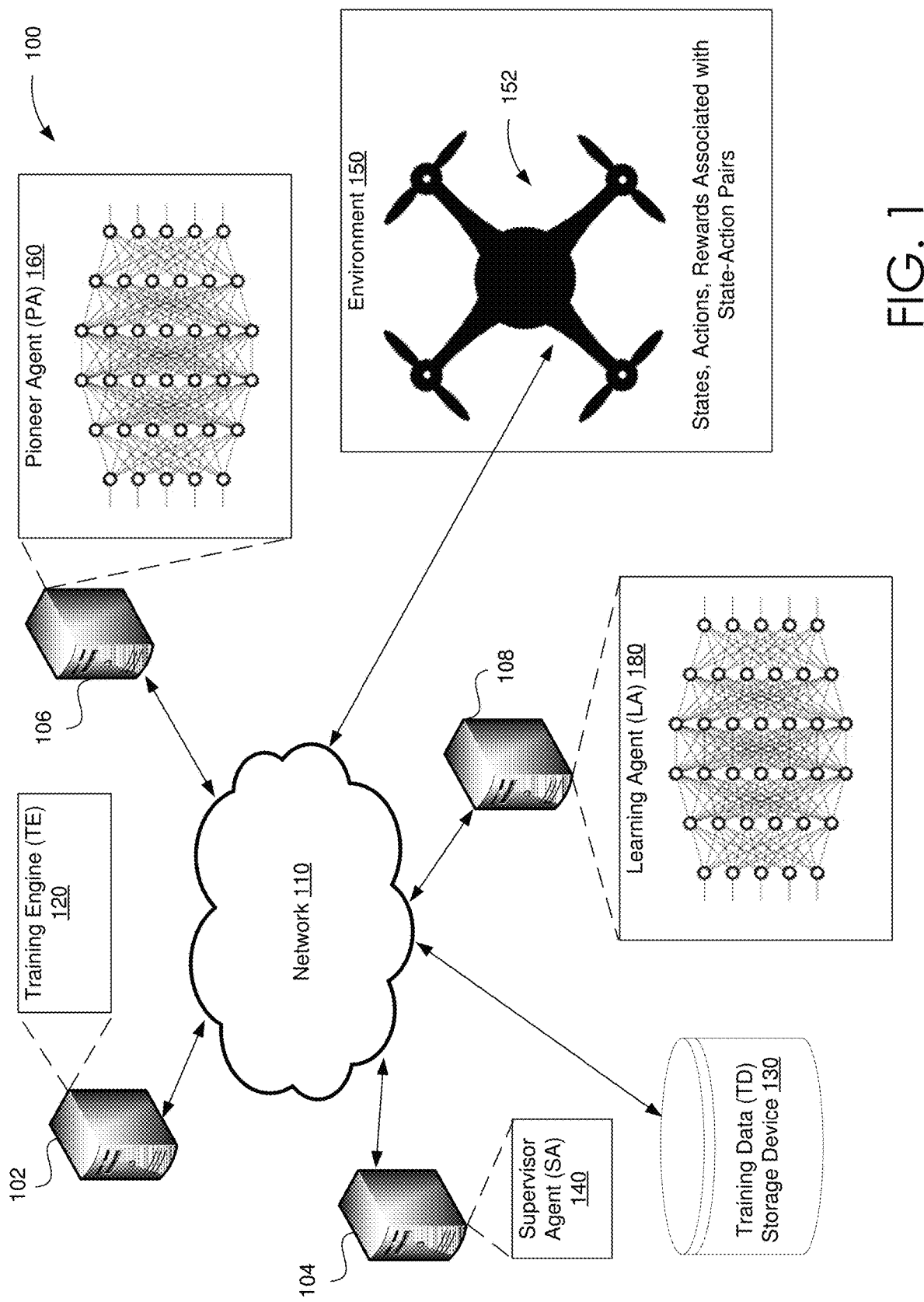
FIG. 1 illustrates an training system implementing various embodiments presented herein.

As used herein, the term "agent" may refer to any component, module, engine function, process, object, system, software package, (real or virtual) computing device, a machine, or any other mechanism or means that can sense, observe, and/or receive a state (or state vector) and return, provide, and/or select an action (or an action vector), in response to the sensed state. The agent may select or return the action via deterministic means or statistical and/or stochastic means. That is, an agent is any mechanism or means that can implement one or more deterministic or statistical state-action policies.

Briefly stated, various embodiments are directed towards addressing various limitations associated with conventional methods for the real-time control of systems and/or objects. The addressed limitations of conventional methods include, but are not limited to efficiency, cost, and safety limitations. That is, the embodiments are directed towards enhanced methods and systems for training an agent to control, in real-time, (real or virtual) objects and/or systems embedded within (real, augmented, or virtual) environments. The enhanced embodiments discussed herein provide the efficient and safe training of a control agent, while reducing costs and potentially hazardous and/or catastrophic events associated with failures and/or errors occurring during the training of the control agent. The control agent trained via the various embodiments may be referred to as a learning agent and/or learner agent.

The various embodiments herein address the limitations of conventional methods by training the learning agent by iteratively alternating the training of the learning agent and a pioneer agent. The training of the learning and pioneer agents is under the supervision of a supervisor agent. The training of the learning agent provides feedback for subsequent training of the pioneer agent. Similarly, the training of the pioneer agent provides feedback for the subsequent training of the learning agent. During the training of the agents, a supervisor coefficient modulates the influence of the supervisor agent. As each of the learning and pioneer agents is iteratively trained (and converge towards less error-prone and more successful control agents), the influence of the supervisor agent on the training process is decayed via the reduction of the supervisor coefficient.

More specifically, under the supervision of the supervisor agent, the learning agent is initially trained to control the (real or virtual object) object and/or system within the (real, augmented, or virtual) environment. During each training iteration of the training of the learning agent, the learning agent generates a learning (or exploratory) signal and the supervisor agent generates a supervisor signal. A combination of the learning signal and the supervisor signal is employed to control the object within the environment. The combination of the learning signal and the supervisor signal is weighted by the supervisor coefficient. Training data is accumulated during the training of the learning agent. After sufficient training of the learning agent under the current level of supervision, the pioneer agent is updated to include similar control behavior to that of the initially trained learning agent. The pioneer agent is then trained, under the supervision of the supervisor agent. However, when training the pioneer agent, the influence of the supervisor agent may be attenuated via an incremental reduction of the value of the supervisor coefficient. A combination of the supervisor signal and a pioneer (or replay) signal generated by the pioneer agent may be employed to train the pioneer agent. The combination of the supervisor signal and the pioneer signal is weighted by the reduced value of the supervisor coefficient. The training data generated during the training of the learning agent may also be employed to train the pioneer agent.

Upon training of the pioneer agent, the learning agent may be updated to include similar control behavior to that of the pioneer agent trained via the reduced supervisor coefficient. The learning agent may then be re-trained, similar to the initial training, with the influence of the supervisor agent being attenuated via the reduced value of the supervisor coefficient. Such alternating and iterative training of the learning and pioneer agents may continue at least until the benefits of the supervisor agent are insignificant, i.e., the training may terminate when the supervisor coefficient is decayed to a value near 0.0. If increased performance from the learning agent is desired, the training of the learning agent may continue, without the supervision of the supervisor agent.

In some embodiments, a reinforcement learning (RL) framework is employed for training each of the learning and the pioneer agents. However, not all embodiments are so constrained, and other machine learning (ML) and/or artificial intelligence (AI) frameworks may employed to train the learning and pioneer agents. Some specific RL implementations are discussed in conjunction with the various embodiments herein. However, note that the RL implementations in the various embodiments may vary, and other general or well-known RL implementations, not specifically discussed herein may be employed in the various embodiments.

Very briefly, RL is a ML framework that is employable to train an agent to perform a task successfully, by sequentially executing actions in a series of temporal steps. The successful performance of the task may be modeled as a "goal." RL generally models the scenario as a Markov decision process (MDP). As such, RL generally models the scenario of an object or system embedded within an environment to perform a task, as an N-dimensional state space, where N is a positive integer. The agent may be embedded within the object, or the agent may remotely control the object. The state space may be a continuous or a discrete space. At each temporal step associated with performing the task, the agent or object may be positioned at a particular location, position, or point within the state space. The goal associated with successful performance of the task may be associated with one or more (contiguous or non-contiguous) particular locations, positions, points, regions, or volumes in the state space. For each location, position, or point within the state space, the object (or system) may execute one or more actions, i.e., the scenario is modeled via a plurality of state-action pairs.

Upon execution of a particular action at a particular state (or location in the state space), the object's state in the state space will undergo a state transition (to the same or a different state), and a (positive or negative) reward associated with that action and state transition is provided. The reward may be indicative of progress towards or regress away from the goal. Note that the returned rewards may be governed by statistical distributions or deterministic functions. A function that statistically or deterministically maps a state-action pair to an expected cumulative reward is often referred to as a "Q-function." Thus, "Q-learning" may include determining a Q-function of a given policy via the observations of exploring state-action pairs. Similarly to the determination of an expected reward, an observed transition within the state space may be governed by statistical distributions or deterministic functions.

In general, a control agent senses, or is provided, the object's location within state space. Based on the current location, the agent selects an available action for the object to execute. That is, an agent includes or is associated with a "policy." An agent's policy statistically or deterministically maps a current state onto an action for execution. The agent is trained to maximize, or at least increase, a statistically-expected value of the cumulative reward over a (finite or infinite) number of temporal steps, wherein each execution of an action (and corresponding reward) is associated with a single temporal step. That is, training an agent includes the determination, generation, and/or updating of the agent's policy, such that the agent's selected actions within the environment tend to maximize, or at least increase, the expected value of the cumulative reward associated with object's path through state space and executed actions (i.e., the agent's sequence of state-action pairs). More succinctly, Q-learning includes training a policy to maximize, or at least increase, a Q-function, based on exploration and exploitation of the state-action pairs, associated rewards, and state transitions. Note that a policy may be a statistical or deterministic function of a state located in the state space.

During the training of the agent, the agent explores the available state-action pairs, and observes the corresponding rewards and state transitions. The training process includes a tradeoff between exploration and exploitation. Given a sufficient amount of exploration, the agent "learns" to select actions, based on sensed or provided current locations within the state space, that tend to increase the expected value of the cumulative reward across the performance of the task. As discussed throughout, unconstrained exploration of the unknown state-action pairs may result in costly or dangerous training errors. In contrast, exploitation of known state-action pairs, via constrained or supervised training, may avoid costly training errors, but fail to converge to a successful policy in an acceptable amount of training time.

As noted above, for some tasks, such as controlling a drone or other autonomous vehicle, controlling a manufacturing robot, or controlling a surgical robot, the state space and the number of state-action pairs are significantly voluminous. For instance, the state spaces for such tasks may be highly dimensional. Furthermore, the state space may be continuous and any discretization for adjacent states may be extremely narrow. Furthermore, the number of available actions at each location may be numerous. Conventional methods of exploration and exploitation will fail to converge to an adequately successful agent in a reasonable amount of time. As also noted above, exploration early in the training of an agent may lead to costly, dangerous, or catastrophic training failures, i.e., crashing a drone or other autonomous vehicle, colliding a manufacturing robotic appendage with a delicate structure, severing a nerve during robotic surgery.

The introduction of a sufficient supervisor agent to supervise the training of a learning agent is beneficial in decreasing both the required amount of training time and the absolute number or relative rate of costly training failures for the learning agent. The learning agent may "learn" to select actions sequentially, based on sequential locations within the state space, which tend to increase the cumulative reward. That is, the learning agent may leverage the capabilities of the supervisor agent. Under the supervision of the supervisor agent and early in the training, the tradeoff between exploitation and exploration is biased towards exploitation. As the learning agent learns and the supervision of the supervisor agent is reduced, the bias may be transitioned towards exploration in later training stages. Furthermore, early in the training, a strong influence of the supervisor agent prevents the selection of "costly" actions, at least until the learning agent has learned enough wisdom or knowledge to avoid selections of costly actions, without influence or supervision from the supervisor agent. Accordingly, the influence of the supervisor agent is decayed or reduced throughout the training process.

Some conventional methods have employed a supervisor agent in a RL framework. However, in such conventional methods, upon the reduction of the influence of the supervisor agent, at least initially, an increased number of costly training failures tend to be observed. See FIGS. 8A-8C herein. This general result is primarily because, as the supervisor influence is lowered, the learning agent was trained to respond adequately under the previously greater influence of the supervisor. That is, the learning agent was not trained to respond adequately under reduced influence of the supervisor. When the supervisor's influence is reduced, at least initially, the learning agent may tend to select actions that result in costly errors.

For instance, under a supervisor's influence of 50% (i.e., the value of the supervisor coefficient set to 0.50), the training process, which consists of controlling an object in real-time, may result in a minimum, or at least acceptably low, error rate. To increase the performance of the learning agent, the supervisor's influence is decreased to 45% (i.e., the value of the supervisor coefficient is decremented to 0.45). During at least the early portions of training a conventional learning agent, under a supervisor's influence of 45%, the rate of costly training errors may increase to an unacceptable level. This is because the learning agent was trained to adequately respond under a supervision influence of 50%, but not trained to respond under a supervisor influence of 45%.

This general limitation, observed in such conventional methods, may be analogized to teacher (e.g., supervisor agent) and student (e.g., learning agent) roles in human subjects. The teacher may train the student to perform a task under a certain level of their influence. When the teacher decreases their supervision (or influence) level, the student may, at least initially, make errors in judgement that, under the previously increased level of supervision, may have been avoided. Under the decreased level of supervision, the student may eventually learn to perform the task without such errors in judgement. However, the cost (or reduced safety) of this learning under reduced supervision may be unacceptable.

In order to avoid the increase in training error rates that is associated with the reduction of the supervisor's influence, various embodiments employ a pioneer agent. As noted above, the learning agent is trained by iteratively alternating the training of the learning agent and the pioneer agent, under the supervision of the supervisor agent. The learning agent is trained at a first value of the supervisor coefficient (e.g., 0.50). During training of the learning agent, a combination (weighted by the supervisor's coefficient) of the supervisor agent's policy (i.e., the supervisor policy) and the learning agent's policy (i.e., the learning policy) is employed to control, in real-time, the object. Also during training of the learning agent, the state-action pairs, as well as corresponding rewards and state transitions (i.e., training data) are observed. The training data are accumulated, along with the training data of previous training of the learning agent. For instance, the accumulated training data may include training data observed from the training of the learning agent under greater influence of the supervisor agent (e.g., at a supervisor coefficient value of 0.55). The accumulated training data is stored, recorded, and/or buffered.

Once the learning agent is adequately trained at the current value of the supervisor coefficient (e.g., 0.50), the pioneer agent is initialized or updated to include the trained learning policy. The supervisor coefficient may be reduced. For example, the supervisor coefficient may be reduced to a value of 0.45. The pioneer agent is then trained, under the reduced level of supervision, via the supervisor agent. Initially during this training of reduced supervision, the pioneer policy of the pioneer agent is equivalent to the learning policy of the learning agent that was trained at the greater level of supervisor influence. During training of the pioneer agent, the pioneer policy is updated to account for the reduced supervisor influence. That is, the pioneer agent learns to control the object with reduced supervisor influence, to that of the learning agent, via replaying samples of the training data accumulated during the previous training of the learning agent.

In contrast to the training of the learning agent, which may include the real-time control of a (real or virtual) object within a (real or virtual) environment, training the pioneer agent under reduced supervisor influence need not involve the real-time control of objects or systems. Rather, as indicated above, during the training of the pioneer agent, at least portions of the training data observed and accumulated during the training of the learning agent may be replayed. Replaying of training data, rather than real-time control of an object, avoids the need of exposing objects and/or environments to costly errors, under reduced supervision. That is, the state-action pairs, corresponding rewards, and state transitions observed in the training of the learning agent may be sampled to train the pioneer agent. Accordingly, any failures or errors occurring during the training of the pioneer agent, under reduced supervisor influence, will not be costly, at least because the training does not involve hardware, physical objects, individuals, customers of online services, critical transactions, or other tangible and/or critical matter or events.

Once the pioneer agent is adequately trained under the reduced supervisor influence, the learning agent may be updated and/or initialized, such that the learning policy is equivalent to the pioneer policy trained under the reduced supervisor influence. At which point, the learning agent may be retrained, via real-time control of the object, under the reduced supervisor influence. This iterative process may continue until the value of the supervisor coefficient is reduced to approximately 0.0. For instance, the value of the supervisor coefficient may initially be set to 1.0, and decayed to approximately 0.0, via the above described alternating training of learning and pioneer agents. In order to further improve the performance of the learning agent, the training of the learning agent may continue, via a conventional or non-conventional RL framework, without the supervision of the supervisor agent.

Note that the various embodiments provide significant improvements over conventional methods and systems of training control agents. During the initial training of the learning agent, the inclusion of the supervisor agent avoids costly errors. Furthermore, the supervisor agent enables biasing the tradeoff between exploration and exploitation towards exploitation, and thus decreases the training time. The inclusion of the pioneer agent trained via replaying sampled training data avoids costly training errors after the reduction in the supervisor influence. As shown in at least FIGS. 8B and 8C, the supervisor agent need not be a perfect, an expert, or even a good supervisor agent. That is, the supervisor policy needs only to have rudimentary knowledge of portions of the state-action pairs and corresponding rewards. In order to avoid costly training errors, the supervisor policy may be more informed via data relating to state-action pairs associated with negative rewards.

In some embodiments, the learning agent (and/or learning policy), as well as the pioneer agent (and/or pioneer policy), is implemented via deep neural networks. In some embodiments, the neural networks are deep Q (referring to the Q-function) networks (DQN). An actor-critic framework may be adopted in the training of each of the learning and pioneering networks. In various embodiments, target networks are used for both the actor and critic networks. The supervisor agent (and/or supervisor policy) may be, but need not be implemented via a deep neural network.

Example Operating Environment

FIG. 1 illustrates a training system implementing various embodiments presented herein. Search system 100 includes one or more of various computing devices, such as but not limited to training engine (TE) computing device 102, supervisor agent (SA) computing device 104, pioneer agent (PA) computing device 106, and learning agent (LA) computing device 108. Other embodiments, system 100 may include additional, alternative, and/or less computing devices. An exemplary, but non-limiting embodiment of a computing device is discussed in conjunction with at least computing device 900 of FIG. 9. That is, at least structures, functionalities, or features of computing device 900 may be included in any of user computing devices 102-108. System 100 may include one or more storage devices, such as but not limited to training data (TD) storage device 130.

System 100 may also include a real or virtual object or system, such as but not limited to aerial drone 152, embedded within a real, augmented, or virtual environment, such as but not limited to environment 150. TE computing device 102 may host or implement a training engine 120. Various embodiments of a training engine are discussed throughout, including at least in conjunction with FIG. 2. However, briefly here, training engine 120 is enabled to train learning agent 180, hosted by LA computing device 108, to control, in real-time, aerial drone 152 to perform one or more tasks, such as but not limited to launching, flying, stabilization, and landing, within environment 150. It should be understood that the embedded object or system is not limited to aerial drone 152, but could be virtually any object or system. Likewise, the task to perform is not limited to controlling aerial drone 152.

More particularly, training engine 120 is enabled to employ a reinforcement learning (RL) framework, such as but not limited to Q-learning, to train learning agent 180 to successfully control, in real-time, aerial drone 152. As such, aerial drone 152, the environment 150, and the performed tasked may be modeled in a RL framework, as an N-dimensional state space, with a plurality of action-state pairs, and associated rewards. As discussed throughout, training engine 120 may employ a supervisor agent 140, hosted by SA computing device 104, and a pioneer agent 160, hosted by PA computing device 106, to train learning agent 180. As shown in FIG. 1, learning agent 180 and/or pioneer agent 160 may be implemented via deep neural networks. Supervisor agent 140 may be, but need not be implemented via a neural network. The agents, as well as testing engine 120 may be implemented in different configurations of computing devices to that shown in FIG. 1. For instance, each of the agents, as well as testing engine 120 may be implemented via a single physical computing device or one or more virtual machines (VM). Any of the agents, including the learning agents 180 may be embedded within aerial drone 152.

A general or specific communication network, such as but not limited to communication network 110, may communicatively couple at least a portion of computing devices 102-108 and one or more storage devices, including but not limited to training data (TD) storage device 130. Communication network 110 may be any communication network, including virtually any wired and/or wireless communication technologies, wired and/or wireless communication protocols, and the like. Communication network 110 may be virtually any communication network that communicatively couples a plurality of computing devices and storage devices in such a way as to computing devices to exchange information via communication network 110.

TD storage device 130 may include volatile and non-volatile storage of digital data. TD storage device 130 may include non-transitory storage media. Communication network 110 may communicatively couple TD storage device 130 to at least a portion of computing devices 102-108. In some embodiments, TD storage device 130 may be a storage device distributed over multiple physical storage devices. Thus, TD storage device 130 may be a virtualized storage device. For instance, one or more "cloud storage" services and/or service providers may provide, implement, and/or enable TD storage device 130. Such cloud services may be provided by a third party. Training data, observed and accumulated during the training of learning agent 180 may be temporarily or persistently stored in TD storage device 130.

Figure 2:
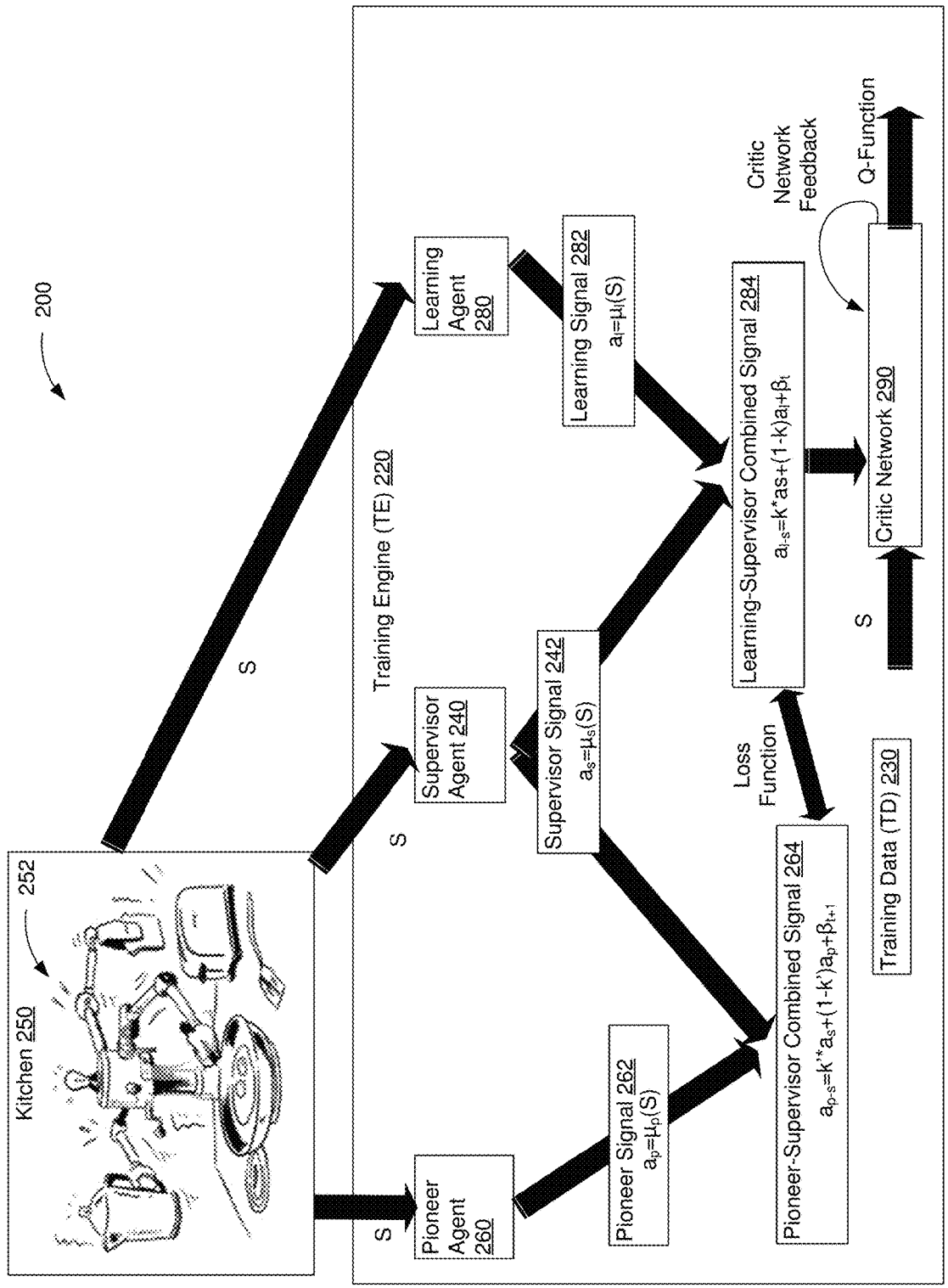
FIG. 2 illustrates one exemplary framework for training a learning agent that is consistent with the various embodiments described herein.

Generalized Framework for Training Learning Agents Via Supervisor and Pioneer Agents FIG. 2 illustrates one exemplary framework 200 for training a learning agent that is consistent with the various embodiments described herein. Framework 200 is a framework to train learning agent 280 to control an object, such as but not limited to robot 252, which is embedded in an environment, such as but not limited to kitchen 250, to perform one or more tasks successfully, such as but not limited to preparing breakfast. Framework 200 employs a training engine (TE) 220. TE 220 may be similar to TE 120 of FIG. 1. In training learning agent 280, a supervisor agent 240, and a pioneer agent 260 are employed. Learning agent 280 may be similar to learning agent 180 of FIG. 1. Likewise, pioneer agent 260 may be similar to pioneer agent 160 of FIG. 1 and supervisor agent 240 may be similar to supervisor agent 160 of FIG. 1. Accordingly, at least learning agent 280 and pioneer agent 260 may be implemented via one or more deep neural networks. TE 220 may employ one or more reinforcement learning (RL) frameworks to training learning agent 280. In various embodiments, an actor-critic RL framework is employed. The role of the critic is implemented via critic network 290, which may also be implemented via one or more deep neural networks.

Architecture for Training a Learning Agent Via Supervisor and Pioneer Agents

As is typical in RL frameworks, the state of the robot 252 within the kitchen 250 is modeled as an N-dimensional state space, where a state within the space is indicated by S. In embodiments where N>1, S may be an N-dimensional vector quantity. At each location S, robot 252 is enabled to execute one or more actions. A function that deterministically or statistically maps, or selects, one of the available actions to the state S is referred to as a policy, μ. Each of supervisor agent 240, pioneer agent 260, and learning agent 280 includes a corresponding policy function. In various embodiments, the policies are deterministic. However, in other embodiments, the policies may be statistical and/or stochastic mappings. Supervisor policy ($\mu_s(S)$) generates a supervisor signal 242 ($a_s$) that deterministically indicates an action for robot 252 to perform, based on state S. That is, supervisor policy deterministically maps a location in the state space to an action. Learning policy ($\mu_l(S)$) generates a learning signal 282 ($a_l$) that deterministically indicates another action, based on state S. Similarly, pioneer policy ($a_p(S)$) generates a pioneer signal 282 ($a_l$) that deterministically indicates another action, based on state S. Because the learning signal explores state-action pairs, the learning signal may be an exploratory signal. For notational purposes throughout, supervisor signal and/or supervisor action may be used interchangeably, and referenced as $a_s$. Likewise, learning signal and learning action may be used interchangeably, and referenced as $a_l$. Pioneer signal and pioneer action may be used interchangeably, and referenced as $a_p$.

During the training of learning agent, the learning policy and the pioneer policy are iteratively updated, such that the policies "learn" to select actions, based on S, that tend to result in the successful performance of the task by robot 252. In the various RL frameworks discussed herein, a reward function ($r(st, a_t)$) maps a state-action pair ($s_t, a_t$) to a reward ($r_t$), i.e., $r_t = r(s_t, a_t)$, where t refers to the time index. The sum of discounted future rewards (Rt) may be determined via $Rt = \Sigma_i^T \gamma^{(i-t)} r(s_t, a_t)$, where $\gamma \in [0,1]$ is a discount coefficient. In general, a Q-function ($Q^\mu$) of a policy (μ) describes the expected return in state $s_t$ after executing action $a_t$ and thereafter, under the policy. In other words, the Q-function, under a particular policy, may be employed to determine or calculate a Q-value. In various Q-learning embodiments, the policy may be a greedy policy. That is, the policy may map a current state to the action that maximizes the Q-value. Via the Bellamn equation, which is a condition for optimality, the Q-function may be written recursively, $$Q^\mu = \mathbb{E}_{r_t, s_{t+1}}[r(s_t, a_t) + \gamma \mathbb{E}_{a_{t+1}}[Q^\mu(s_{t+1}, a_{t+1})]].$$

In embodiments where the state and action spaces are discrete, the Q-function and policies may be encoded in a lookup table. In embodiments where the state and/or action spaces are continuous, a neural network, such as but not limited to a deep Q network (DQN) may be employed to encode or implement a policy and corresponding Q-function. As used throughout, the notation $\theta^\mu$ represents the parameters of a neural network implement policy $\mu$. The network may be optimized via minimizing a loss function:

$$L(\theta^\mu) = \mathbb{E}[(Q(s_t, a_t | \theta^\mu) - y_t)^2], \text{ where}$$

$$y_t = r(s_t, a_t) + \gamma Q^\mu(s_{t+1}, \mu(s_{t+1})).$$

In the above expressions, $y_t$ represents the reward observed in response to taken actions. Accordingly, the loss function measures the difference between Q-function, as determined via the neural network and the expected return, as observed via exploring state-action pairs. In various embodiments, the dependence of $y_t$ on network parameters $\theta^\mu$ is ignored. Training an agent, or corresponding policy, includes iteratively exploring state-action pairs, and updating $\theta^\mu$, such that the network more accurately predicts returns, and thus the policy returns actions that tend to work towards achieving the goal associated with the task.

In various embodiments, where the action space is continuous and the policy of an agent is a deterministic function, then via a reduction of the inner expectation value of the recursive representation of the Q-function, the Q-function for the deterministic policy may be determined via:

$$Q^\mu = \mathbb{E}_{r_t, s_{t+1}}[r(s_t, \mu(s_t)) + \gamma Q^\mu(s_{t+1}, \mu(s_{t+1}))].$$

Note in the various actor-critic embodiments, critic network 290 may implement a Q-function, while pioneer agent 260 and/or learning agent 280 may implement a policy (i.e., an actor) network. That is, the parameters of critic network 290 are iteratively updated to calculate or determine a Q-function, while the parameters of networks associated with pioneer agent 260 and learning agent 280 are iteratively updated to calculate or determine the respective policies.

The above loss function may be minimized via various minimization methods, including but not limited to gradient descent methods. For instance, a deterministic policy gradient (DPG) method may be used to iteratively descend the gradient of the loss function as follows:

$$\nabla_{\theta^\mu} J \approx \mathbb{E}_{s_t}[\nabla_{\theta^\mu} Q(s_t, a | \theta^\mu)|_{a = \mu(s_t | \theta^\mu)} \cdot \nabla_{\theta^\mu} \mu(s_t | \theta^\mu)].$$

In various embodiments, target networks may be implements for both actor and critic networks. During training of the learning network, the parameters of the target (learning and critic) networks ($\theta'$), may be updated based on the parameters of the trained actor and critic networks, based on a scaling coefficient, $\tau \ll 1$, via $\theta' = \tau \theta + (1 - \tau) \theta'$.

The various embodiments train the learning agent 280 by iteratively alternating the training of the learning agent 280 and the pioneer agent 260. The training of the learning agent 280 and the pioneer agent 260 is under the supervision of the supervisor agent 240. The training of the learning agent 280 provides feedback for subsequent training of the pioneer agent 260. Similarly, the training of the pioneer agent 260 provides feedback for the subsequent training of the learning agent 280. During the training of the agents 260/280, a supervisor coefficient (k) modulates the influence of the supervisor agent 240, wherein $k \in [0, 1]$. As each of the learning agent 280 and the pioneer agent 260 is iteratively trained (and converge towards less error-prone and more successful control agents), the influence of the supervisor agent 240 on the training process is decayed via the reduction of the supervisor coefficient (k).

More specifically, under the supervision of the supervisor agent 240, the learning agent 280 is initially trained to control, in real-time, robot 252 within kitchen 250. In some embodiments, the value of the supervisor coefficient may be set to 1.0, so that the robot 252 is entirely controlled by the supervisor agent 240. The knowledge of the supervisor agent 240 may be exploited or leveraged to train the learning agent 280. More particularly, during each training iteration of the initial training of the learning agent 280, the learning agent 280 generates a learning (or exploratory) signal 282 and the supervisor agent 240 generates a supervisor signal 242. The learning signal 282 indicates and/or encodes a learning action ($a_l$) selected by the learning policy of the learning agent 280, based on the observed state (S) of the robot 252 with kitchen 252. Likewise, supervisor signal 242 indicates and/or encodes a supervisor action ($a_s$) selected by the supervisor policy of the supervisor agent 240, based on state S. FIG. 2 illustrates each of supervisor agent 240, pioneer agent 260, learning agent 280, and critic network 290 sampling, being provided, observing, or receiving state signal (S) that indicates the state. Note that S may be a vector quantity of N-dimensions, i.e., S may include the same number of dimensions that characterize the state space.

A combination of the exploratory signal and the supervisor signal (i.e., learning-supervisor combined signal 284 ($a_{l-s}$)) is employed to control the robot 252 within the kitchen 259. As shown in FIG. 2, the learning-supervisor combined signal 284 is weighted by the supervisor coefficient (k). As also shown in FIG. 2, in some embodiments, learning-supervisor combined signal 284 may include a time-dependent noise term $\beta_t$. The strength of the noise component included in learning supervisor combined signal 284 may be decayed as the temporal index increases. In other embodiments, the noise term is not included in the learning-supervisor combined signal 284, or its value is set to 0.0. The weighted combination of the supervisor policy ($\mu_s(s)$) and the learning policy ($\mu_l(s)$), may be referred to as the learning-supervisor combined policy ($\mu_{l-s}(s) = k \mu_s(s) + (k-1) \mu_l(s)) + \beta_t$. The learning-supervisor combined signal 284 indicates a learning-supervisor combined action ($a_{cl}$). Training data 230 is accumulated during the training of the learning agent 280. Each training iteration may be indexed via temporal index t. During each iteration, the 4-tuple [$s_t$, $a_t$, $r_t$, $s_{t+1}$] may be added to training data 230, where $s_t$ indicates the observed (or current) state at temporal index t. Similarly, $a_t$ indicates the learning-supervisor combined action at temporal index t and $r_t$ indicates the observed reward, in response to the robot 252 executing the learning-supervisor combined action ($a_l$) temporal index t. $s_{t+1}$ indicates the next state that results in response to the execution of the learning-supervisor combined action ($a_t$). That is, $s_{t+1}$ indicates the next state at temporal index t+1. Furthermore state-pair ($s_t$, $s_{t+1}$) indicates the state transition in response to robot 252 executing action $a_t$, while in state $s_t$. As noted throughout, training learning agent 280 includes updating the learning policy implemented by the actor neural network of learning agent 280.

After sufficient training of the learning agent 280, the pioneer agent 260 is updated to include similar control behavior to that of the initially trained learning agent 280. In some embodiments, the pioneer policy, implemented by neural network of pioneer agent 260 is updated and/or initialized to be equivalent to the trained learning policy. The pioneer agent 260 is then trained, under the supervision of the supervisor agent 240. However, when training the pioneer agent 260, the influence of the supervisor agent 240 may be attenuated via an incremental reduction of the value of the supervisor coefficient (k). For example, the value of k may be updated to k'=0.95, or another value that is less than 1.0. A combination of the supervisor signal 242 and a pioneer (or replay) signal 262 ($a_p = \mu_p(s)$) generated by the pioneer agent 260 may be employed to train the pioneer agent 260. The combination of the supervisor signal and the replay signal may be a pioneer-supervisor combined signal ($a_{p-s}$) 264 and, as shown in FIG. 2, is weighted by the reduced value of the supervisor coefficient (k'=0.95). The pioneer-supervisor combined signal 264 may include the noise term, as shown in FIG. 2. The weighted combination of the supervisor policy ($\mu_s(s)$) and the pioneer policy ($\mu_p(s)$), may be referred to as the pioneer-supervisor combined policy ($\mu_{p-s}(s) = k\mu_s(s) + (k-1)\mu_p(s) + \beta_t$.

When training the pioneer agent 260, instead of controlling the robot 252 in real-time, the training data 230 generated during the training of the learning agent 280 may be employed. That is, samples from training data 230 may be employed to replay traversals through the state-action spaces, rather than risking costly errors associated with controlling, in real-time, robot 252. Upon training of the pioneer agent 260, via the replay of portions of the training data 230, the learning agent 280 may be updated to include similar control behavior to that of the pioneer agent trained via the reduced supervisor coefficient. That is, the learning policy of the learning agent 280 may be updated or initialized to be equivalent to the trained pioneer policy of the pioneer agent 260.

The learning agent 280 may then be re-trained, similar to the initial training, with the influence of the supervisor agent 240 being attenuated via the reduced value of the supervisor coefficient (k=0.95). Such alternating and iterative training of the learning agent 280 and the pioneer agent 260 may continue at least until the benefits of the supervisor agent 240 are insignificant, i.e., the training may terminate when the supervisor coefficient is decayed to a value near k=0.0. If increased performance from the learning agent 280 is desired, the training of the learning agent 280 may continue, without the supervision of the supervisor agent 260.

Training a Learning Agent Under the Supervision of a Supervisor Agent

In the various embodiments, the critic function is implemented by critic network 290 and is represented as $Q(s, a|\theta^Q)$, where $\theta^Q$ represents the parameters of the critic network 290. An actor network implements the learning policy in learning agent 280 and is represented as $\mu_l(s|\theta^\mu)$, where $\theta^\mu$ represents the parameters of the actor network. In various embodiments, the supervisor policy ($\mu_s$) is a fixed (or constant) policy, and thus the learning-supervisor combined network is represented as $\mu_{l-s}(s|\theta^\mu)$.

The critic network parameters ($\theta Q$) may be optimized by minimizing the above loss function that measures the expected loss of the square of the difference between the Q-function and the observed reward ($y_t$). The learning actor network parameters ($\theta^\mu$) may be iteratively updated via the gradient descent methods discussed above. More specifically, may be adjusted via the following expression:

$$\nabla_{\theta^\mu} J_a \approx \mathbb{E}_{s_t} [\nabla_a Q(s_t, a|\theta^Q)|_{a=\mu(s_t|\theta^\mu)} \nabla_{\theta^\mu} \mu_a(s_t|\theta^\mu)] \cdot (1-k).$$

The above expression optimizes the performance of the learning-supervisor combined policy. In the various embodiments, the learning policy may be trained to mimic the response of the supervisor. Thus, a loss function between the supervisor policy and the learning policy may be defined as:

$$L(\theta^\mu) = \frac{1}{2} \mathbb{E}[(\mu_a(s|\theta^\mu) - \mu_s(s))^2].$$

The learning actor network parameters ($\theta^\mu$) may be further updated based on descent of the following gradient:

$$\nabla_{\theta^\mu} J_s = \mathbb{E}[(\mu_a(s|\theta^\mu) - \mu_s(s))].$$

In the various embodiments, to simultaneously improve the performance of the combination of the performance of the learning-supervisor combined policy and train the learning policy to mimic the behavior of the supervisor policy, the sum of $\nabla_{\theta^\mu} J_a$ and $\nabla_{\theta^\mu} J_s$ gradients is optimized. That is, the following gradient is descended in the training of the learning agent 280.

$$\nabla_{\theta^\mu} J_s' = \nabla_{\theta^\mu} J_s + \lambda \nabla_{\theta^\mu} J_s,$$

where $\lambda$ is a scaling coefficient. Note that the above expression limits the ability of the learning agent 280 to learn beyond the knowledge of the supervisor agent 240. Accordingly, the scaling coefficient may be reduced, similar to the reduction of the supervisor coefficient, as the training progresses, so that the learning agent 280 may learn more from exploring the state-action pairs, rather than mimicking the performance of the supervisor agent 240. In some embodiments, the value of the scaling coefficient is set to be equivalent to the value of the supervisor coefficient.

Training a Pioneer Agent Under the Reduced Supervision of a Supervisor Agent

After one or more training epochs of training the learning agent 280, the pioneer agent is trained under reduced supervision or influence from the supervisor agent 240. That is, after one or more epochs, the parameters ($\theta^\mu$) of the learning actor policy ($\mu_l$) converge to adequate performing values, under the supervision level indicated by the current value of k. For illustrative, but non-limiting, purposes, consider the temporal index at the end of the one or more epochs of learning agent training as having the value of $t_1$. At $t_2$, where $t_2 > t_1$, the training of the pioneer network begins. The value of the supervisor coefficient is reduced from $k_{t_1}$ to $k_{t_2}$, where $k_{t_1} > k_{t_2}$. For instance, k may be reduced from 1.0 to 0.95. Other de-increments of k may be chosen, depending on a desired decay ray of the supervisor influence. The pioneer policy is updated or initialized to be equivalent to the trained learning actor policy ($\mu_l$). The network parameters of the learning actor policy, at $t_1$, may be referenced as $\theta_{t_1}^\mu$. When copied into pioneer policy of the pioneer agent at $t_2$, the network parameters of the pioneer policy are referenced as $\theta_{t_2}^\mu$. Thus, at $t_2$, the pioneer-supervisor combined policy may be represented as follows:

$$\mu_{p-s}(s_{t_2}|\theta_{t_2}^\mu) = k_{t_2} \mu_s(s_{t_2}) + (1 - k_{t_2}) \mu_p(s_{t_2}|\theta_{t_2}^\mu) + \beta_{t+1}.$$

The pioneer agent 260 may be trained, such that the pioneer policy behaves similarly to the previously trained learning-supervisor combined policy. A loss function that measures the difference between the pioneer policy ($\mu_p$), under training, and the previously trained learning-supervisor combined policy. More specifically, the network parameters ($\theta_{t_2}^\mu$) of the pioneer agent 260 may be updated by minimizing the loss function. One such exemplary loss function is as follows:

$$L(\theta_{t_2}^\mu) = \frac{1}{2} \mathbb{E}[(\mu_{p-l}(s) - a)^2].$$

Where a is the output of the previous combined policies, i.e., a is the corresponding learning-supervisor combined signal 282 or action ($a_{l-s}$), under the previous value of the supervisor coefficient ($k_l$). The value of a may be obtained via training data 230. The above loss function may be minimized (and thus the pioneer policy may be trained via updating pioneer network parameters $\theta_{t_2}^\mu$) by descending to the following gradient:

$$\nabla_{\theta_{t_2}^\mu} J_p = \mathbb{E}[(\mu_{p-l}(s) - a)].$$

Note that because the value of a may be looked up, rather than exploring state-action pairs via the real-time control of robot 252, physical damage to robot 252 or kitchen 250 is avoided under the reduced influence of supervisor agent 240. Note that in some embodiments, target networks are employed for both critic network 290 and the actor network for learning agent 280 to prevent actor and critic networks from divergence.

Generalized Processes for Training a Learning Agent

Figure 3:
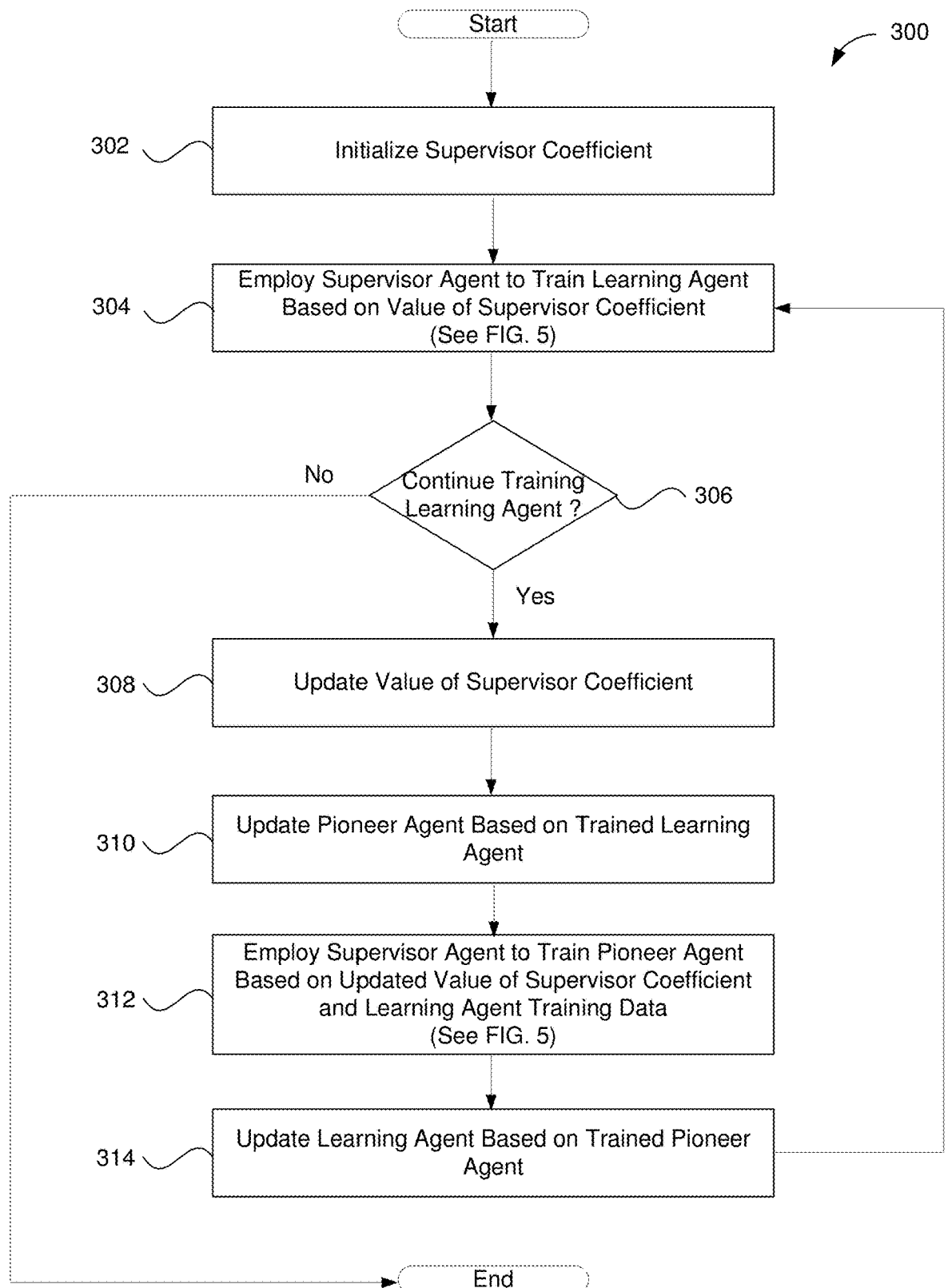
FIG. 3 illustrates one embodiment of an enhanced process flow for training a learning agent that is consistent with the various embodiments presented herein.
Figure 4:
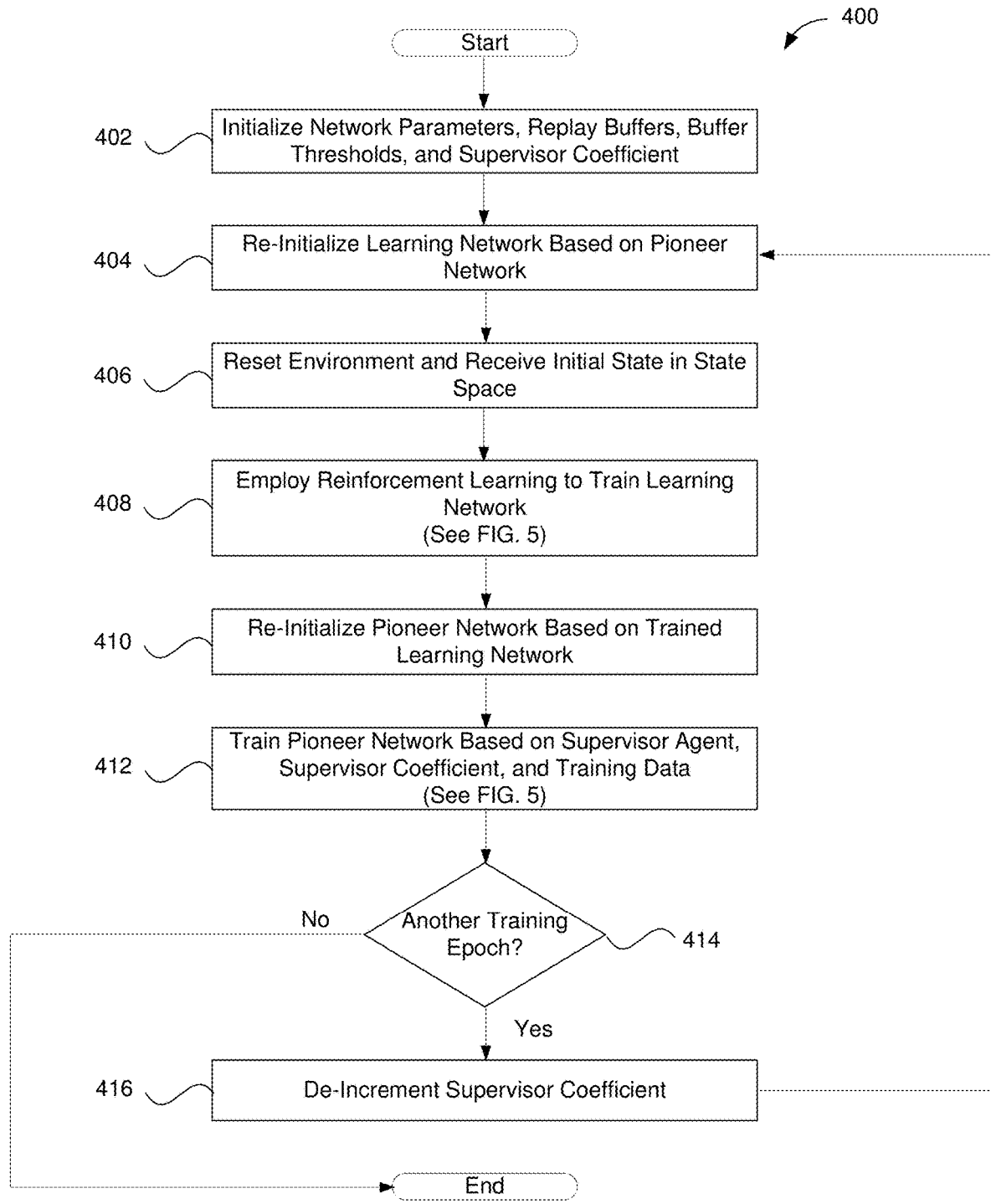
FIG. 4 illustrates one embodiment of another enhanced process flow for training a learning network of a learning agent that is consistent with the various embodiments presented herein.
Figure 5:
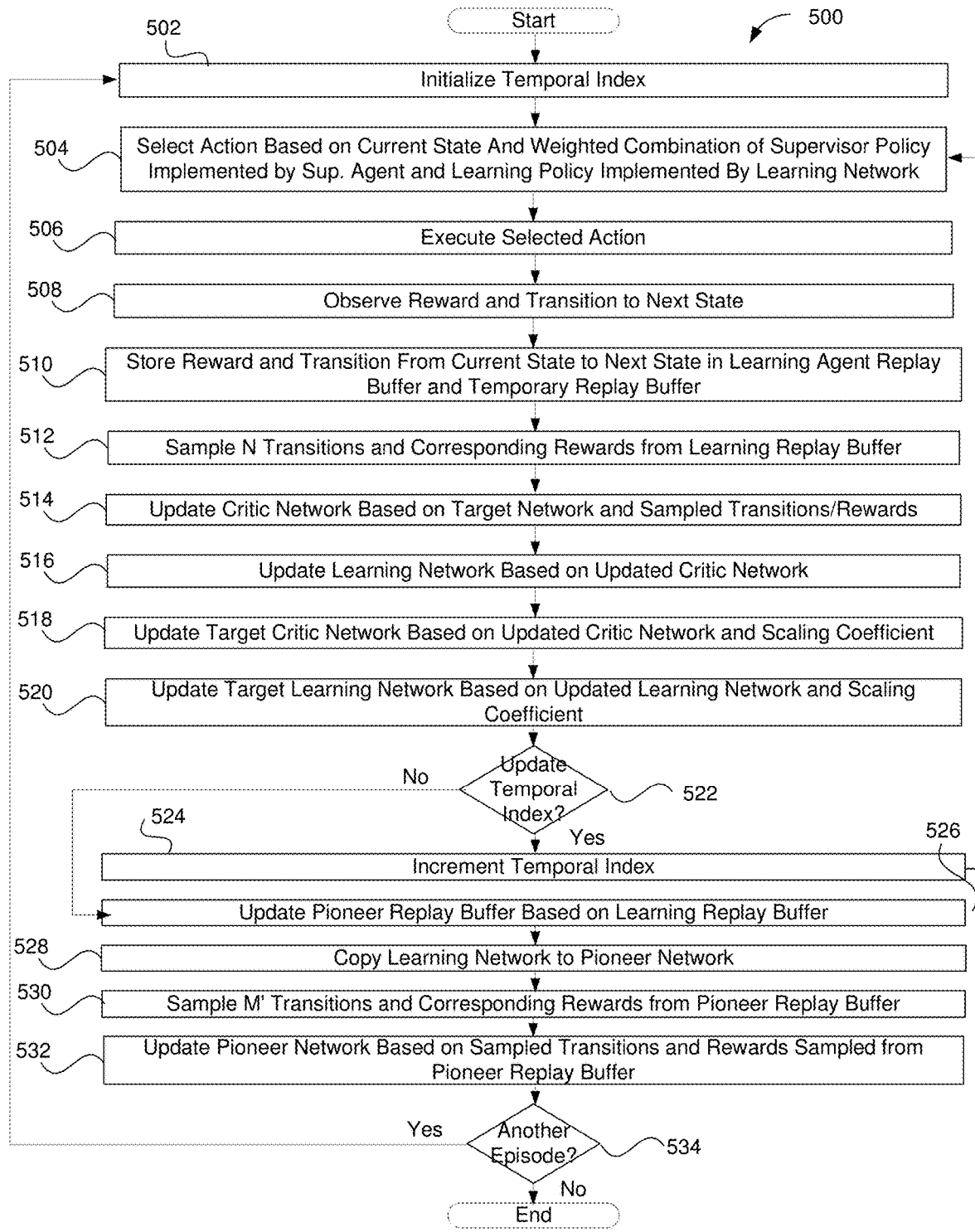
FIG. 5 illustrates one embodiment of still another enhanced process flow for training a learning network of a learning agent that is consistent with the various embodiments presented herein.
Figure 9:
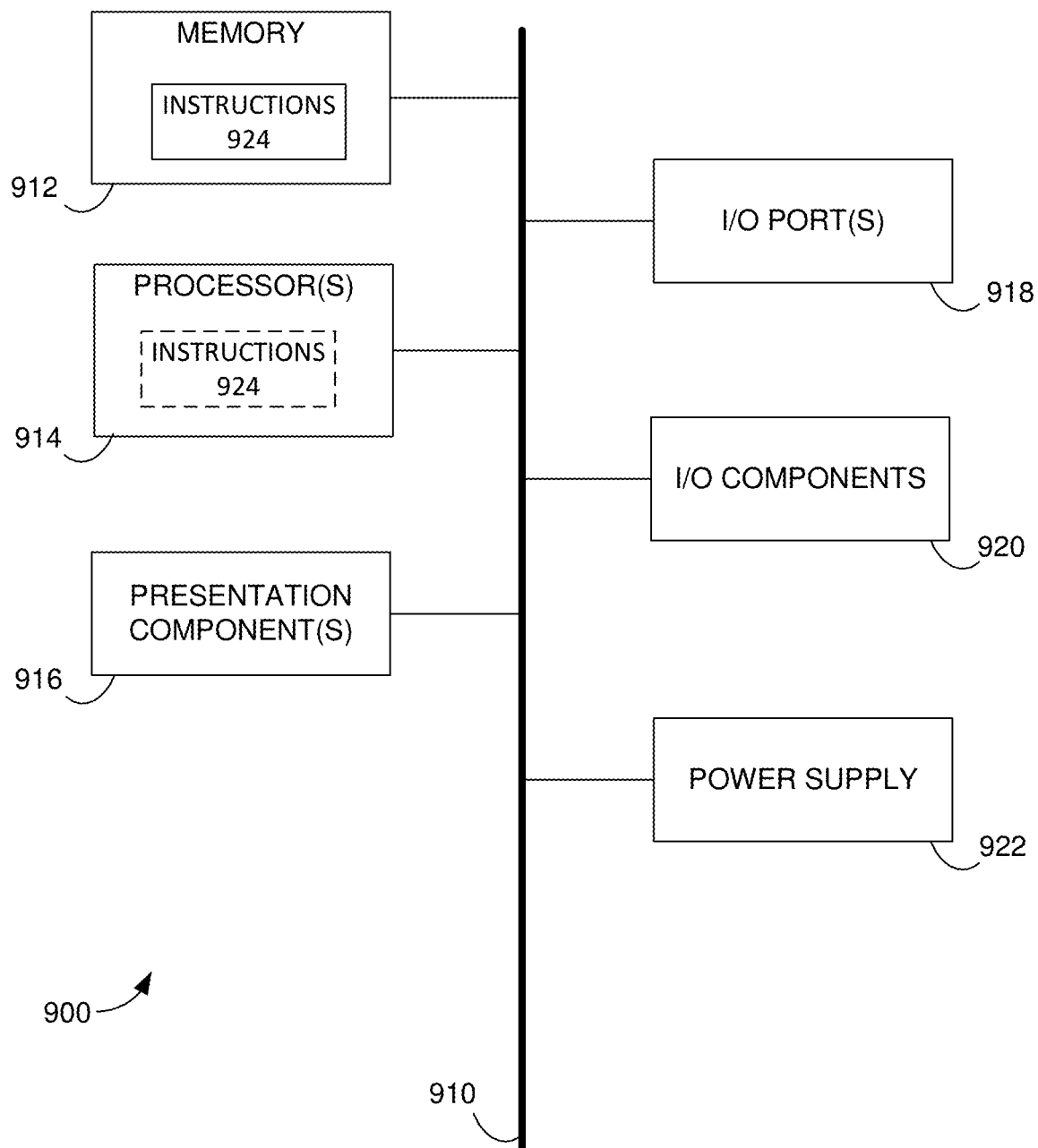
FIG. 9 is a block diagram of an example computing device in which embodiments of the present disclosure may be employed.

Processes 300-500 of FIG. 3-5, or portions thereof, may be performed and/or executed by any computing device, such as but not limited to computing devices 102-108 of FIG. 1, as well as computing device 900 of FIG. 9. Additionally, training engine, such as but not limited to training engine 120 of FIG. 1 or training engine 220 of FIG. 2, may perform and/or execute at least portions of processes 300-500.

FIG. 3 illustrates one embodiment of an enhanced process flow for training a learning agent that is consistent with the various embodiments presented herein. Process 300 begins, after a start block, at block 302, the supervisor coefficient (k) is initialized. For instance, the value of k may be set to 1.0. At block 304, a supervisor agent is employed to train the learning agent based on the value of the supervisor agent. For instance, the learning agent may be trained for one or more epochs, under a supervisor influence level indicated by k, as discussed throughout. Some embodiments for training a learning agent are discussed in conjunction of process 500 of FIG. 5, as well as pseudo-code 600 of FIG. 6. As discussed throughout, in block 304, an object or a system may be controlled in real-time. Training data, which includes observations of the real-time control of the object or system, may be accumulated at block 304.

At decision block 306, it is determined whether to continue training the learning agent. For instance, if the value of k is approximately or equivalent to 0.0, then the training of the learning agent is terminated, and process 300 may proceed to the end block. Otherwise, the training of the learning agent may continue, and process 300 flows to block 308. At block 308, the value of the supervisor coefficient is updated. For instance, the value of k may be reduced or de-incremented by any desired amount. In one non-limiting embodiment, k is reduced in increments of 0.5. In other embodiments, k is reduced in increments of 0.1. The increment that k is reduced may be varied throughout process 300. At block 310, a pioneer agent is updated and/or initialized based on the trained learning agent. In one embodiment, the trained learning policy of the learning agent is copied into the pioneer agent, such that the pioneer policy of the pioneer agent is equivalent, or at least similar to, the trained learning policy.

At block 312, the supervisor agent is employed to train the pioneer agent based on the updated or reduced value of the supervisor agent and the training data accumulated in block 304. Some embodiments for training a pioneer agent are discussed in conjunction of process 500 of FIG. 5, as well as pseudo-code 600 of FIG. 6. Training the pioneer agent may include replaying at least portions or samples of the training data. Controlling the object or system in real-time may not be required to train the pioneer agent at block 312. At block 314, the learning agent is updated and/or initialized based on the trained pioneer agent. In one embodiment, the trained pioneer policy of the pioneer agent is copied into the learning agent, such that the learning policy of the learning agent is equivalent, or at least similar to, the trained pioneer policy. Process 300 may then return to block 304, such that the learning agent may be trained under the reduced influence of the supervisor agent.

FIG. 4 illustrates one embodiment of another enhanced process flow for training a learning network of a learning agent that is consistent with the various embodiments presented herein. FIG. 5 illustrates one embodiment of still another enhanced process flow for training a learning network of a learning agent that is consistent with the various embodiments presented herein. FIG. 6 illustrates pseudo-code that implements various portions of processes 400 and 500 of FIGS. 4 and 5 respectively. Processes 400 and 500 are discussed in conjunction with pseudo-code 600 of FIG. 6. Process 400 begins, after a start block, at block 402, where various network parameters, replay buffers, buffer thresholds, and the supervisor coefficient is initialized. Line 1 of pseudo-code 600 show the initialization of critic network parameters, the learning actor network parameters, and the parameters of the pioneer network. The learning action network or policy is referenced as $\mu_a$ in pseudo-code 600, whereas in other embodiments discussed herein, it is references as $\mu_l$. Note that throughout pseudo-code 600, the noise term, discussed and referenced herein as $\beta t$, is referenced as $\mathcal{N}$. Lines 2-5 of pseudo-code 600 shows the initialization of other quantities or data structures, such as target network parameters and replay buffers, which may store training data observed during the training of the learning agent. Line 6 of pseudo-code shows the beginning of epoch or episodic loops for training the learning agent. Pseudo-code 600 includes M epochs or episodes. Accordingly, the supervisor coefficient may be decreased by 1/M (line 32) when an episode or epoch finishes.

At block 404, the learning network is re-initialized and/or updated based on the pioneer network. Line 8 of pseudo-code 600 shows the re-initialization of the learning network. At block 406, the environment is reset and an initial state in the state space is received. Line 10 of pseudo-code 600 shows resetting the environment and receiving the initial state $s_l$. At block 408, a reinforcement learning (RL) framework is employed to train a learning network of the learning agent. Various embodiments of training a learning network or learning agent are discussed in throughout, including at least in conjunction with process 500 or FIG. 1. Various steps in training a learning network are shown in lines 11-26 of pseudo-code 600.

At block 410, a pioneer network of a pioneer agent is re-initialized based on the trained learning network. Line 27 of pseudo-code 600 shows an embodiment of re-initializing or updating the pioneer network by copying the parameters of the learning network to the parameters of the pioneer network. At block 412, the pioneer network is trained based on the supervisor agent, the supervisor coefficient, and the training data accumulated during the training of the learning network. Various embodiments of training a pioneer network are discussed throughout, including at least in conjunction with process 500 of FIG. 5 and pseudo-code 600. Lines 28-30 show training the pioneer network.

At decision block 414, it is decided whether to undergo another training episode or epoch. For instance, if the value of the episode index is equivalent to M, then process 400 may terminate. Otherwise, process 400 may flow to block 416. At block 416, the supervisor coefficient is de-incremented. Lines 31-33 show the decreased in k, as well as other quantities or data structures that may be updated at block 416. Process 404 may return to block 404, to re-initialize the learning network based on the trained pioneer network, so that the training of the learning network may continue. In pseudo-code 600, process 400 may return to line 6 to update the episode index.

Process 500 may begin, after a start block, at block 502, where the temporal index is initialized. The loop of process 500 is illustrated in lines 11-30 of pseudo-code 600. Line 11 shows the initialization of the temporal index. At block 504, an action is selected based on the current state. The selected action may be further based on a weighted combination policy that includes the supervisor policy of the supervisor agent (or network) and the learning policy implemented by the learning network. Line 12 of pseudo-code 600 shows the selection of an action. At block 506, the object is caused to execute the selected action. At block 508, in response to executing the action, the associated reward and transition to the next state is observed. Line 12 shows an implementation of block 508.

At block 510, the observed reward and transition from the current state to the next state is stored. The reward and transition may be stored in a learning agent replay buffer and/or a temporary buffer. Line 14 shows the storage of a 4-tuple training data in the buffer. The storage of this 4-tuple may be included in the accumulation of training data. At block 512, N state transitions and corresponding rewards are sampled from the learning replay buffer. Line 15 shows the sampling of the 4-tuples from the training data stored in the learning replay buffer. At block 514, the critic network is updated based on the target network and the sampled training data. Lines 15-18 illustrate the updating of the critic network. At block 516, the learning network is updated based on the updated critic network. Lines 19-21 illustrate updating the learning network. At block 518, the target critic network is updated based on the updated critic network and a scaling coefficient. Lines 22-23 illustrate updating the target critic network. At block 520, the target learning actor network is updated based on the updated learning network and the scaling coefficient. Lines 22 and 24 illustrate updating the target learning actor network.

At decision block 522, it is decided whether to update temporal index. If the temporal index is not updated, process 500 may flow to block 524, where the temporal index is incremented. Process 500 may then return to block 504 to select another action based on the next state. Otherwise, process 500 flows to block 526, where the pioneer replay buffer is updated based on the learning replay buffer. Lines 25-26 of pseudo-code 600 show the updating of the pioneer replay buffer. At block 528, the trained learning network is copied to the pioneer network. Line 27 shows copying the trained learning network to the pioneer network. At block 530, M' state transitions and corresponding rewards are sampled from the training data. Line 28 illustrates sampling 4-tuples from the training data. At block 532, the pioneer network is updated based on the sample transitions and the supervisor agent. Lines 29-30 show the update of the pioneer network.

Experimental Results

Figure 7:
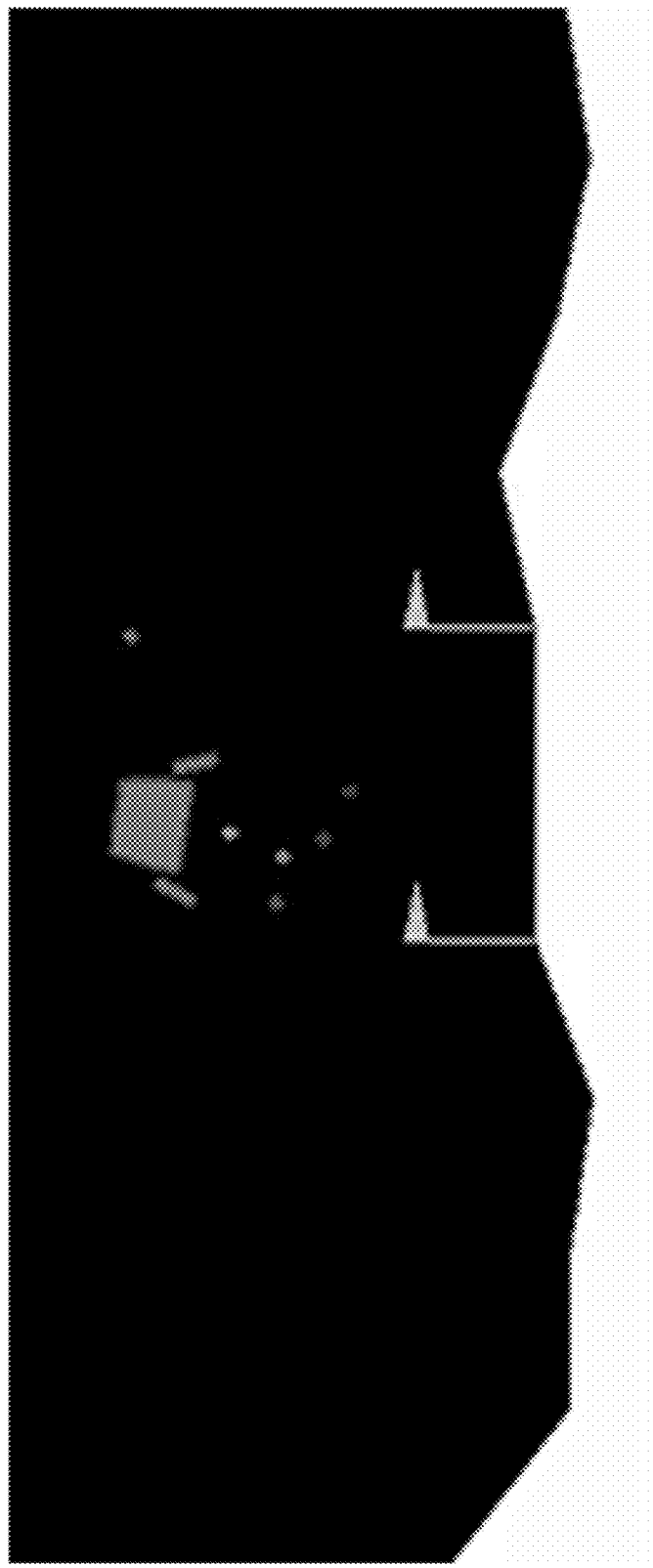
FIG. 7 illustrates a non-limiting example of an object, controllable via a learning agent as discussed herein, performing a task.
Figure 8A:
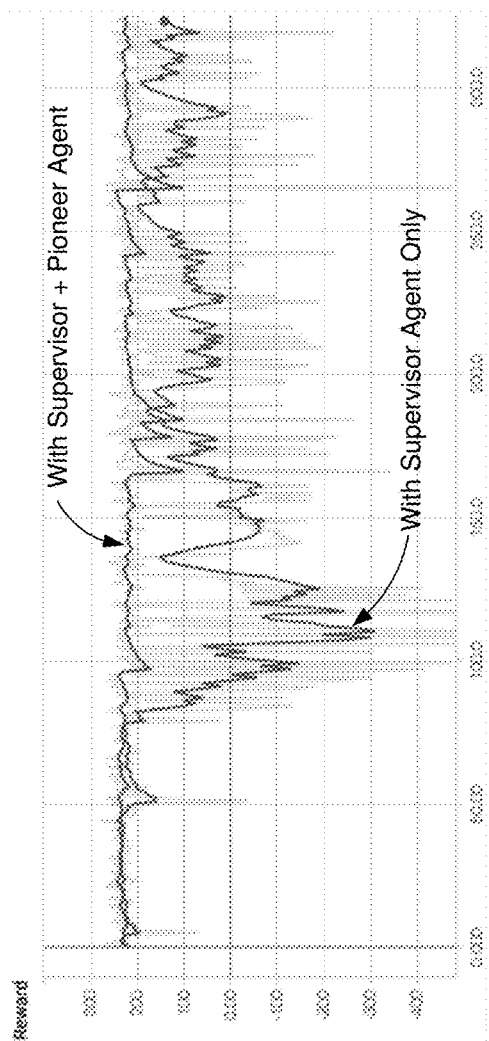
FIGS. 8A-8C shows various results in training a learning agent to control the object in the performance of the task of FIG. 7.
Figure 8B:
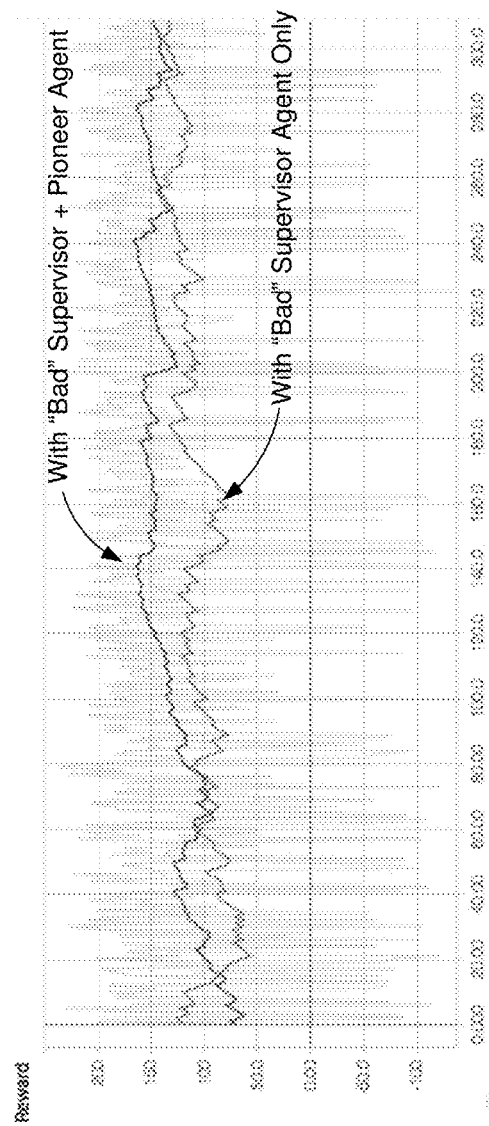
Figure 8C:
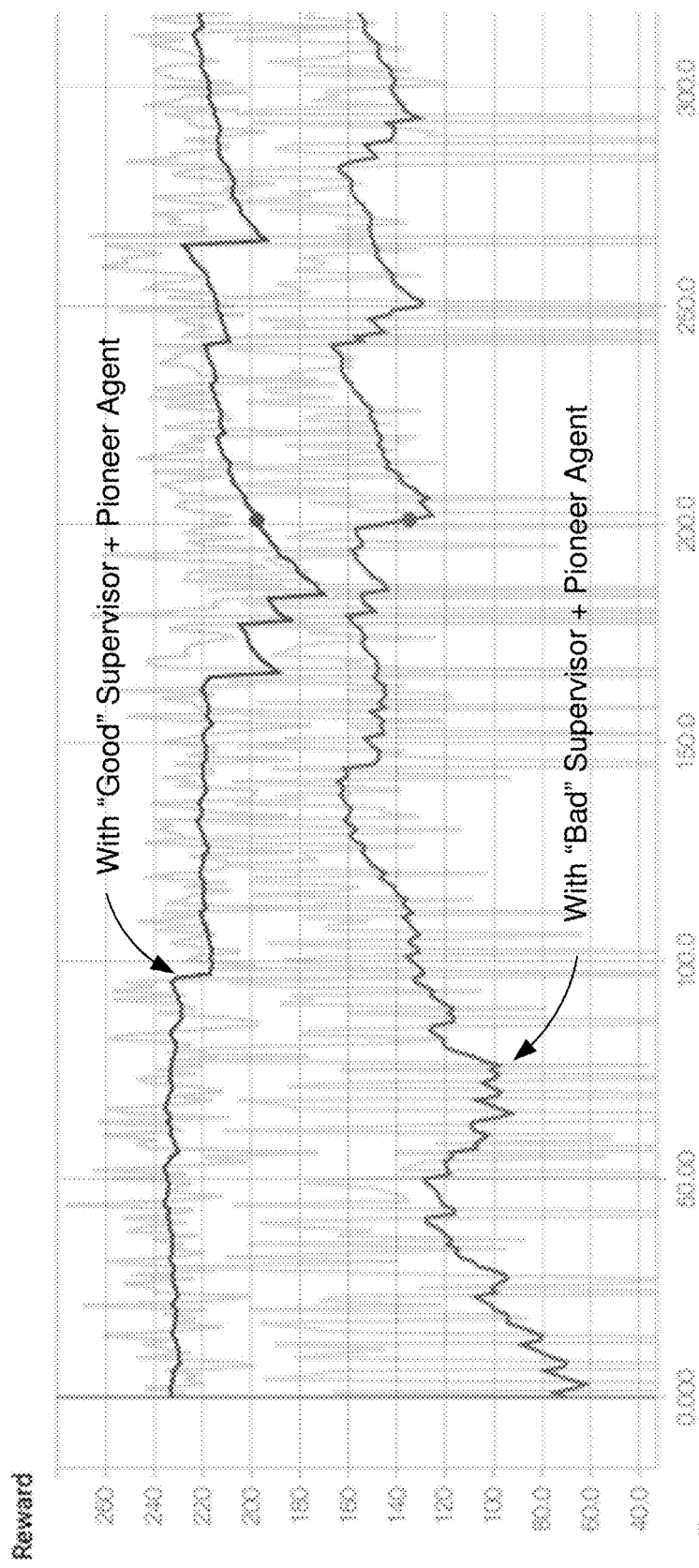

FIG. 7 illustrates a non-limiting example of an object, controllable via a learning agent as discussed herein, performing a task. More specifically, FIG. 7 shows a screenshot of the LunarLander-v2 environment/task included in the widely available OpenAI Gym toolkit. Various embodiments discussed herein were employed to train a learning agent to control the lunar lander for a safe landing between the two flagpoles, and without crashing. FIGS. 8A-8C shows various results in training a learning agent to control the object in the performance of the task of FIG. 7. In the experimental results of FIGS. 8A-8C, a rewards of +200 is given for a successful landing of the lunar lander, and a reward <0 is given for a crash. The supervisor coefficient is reduced by 6% every 4 episodes of training the learning agent. FIGS. 8A-8C includes plots of experimentally determined reward vs. training episode experimental data. In the plots of FIGS. 8A-8C, the x-axis indicates the number of episodes for training the learning agent and the y-axis indicates the total cumulative reward. In FIGS. 8A-8C, the larger the y-value for data points, the greater the cumulative reward. Thus, the y-value indicates a performance metric for the training.

FIG. 8A shows a plot of learning data, where the learning agent was only trained via a supervisor agent. That is, no pioneer agent was employed. FIG. 8A also shows a plot of learning data, where a pioneer agent was employed along with the supervisor agent, as discussed in conjunction with the various embodiments described herein. A visual inspection of the two plots of FIG. 8A illustrates a significant improvement via the employment of a pioneer agent. As shown in FIG. 8A, without the employment of a pioneer agent, when the supervisor coefficient falls below a critical value, numerous crashes in the lunar lander are observed. The employment of the pioneer agent avoids many of these crashes. The employment of a pioneer agent improves the speed of training a learning agent, as well as avoiding costly training errors.

FIG. 8B is similar to FIG. 8A, except the two plots of FIG. 8B illustrate the employment of a "bad" supervisor agent. As shown in FIG. 8B, the use of a pioneer agent improves the speed and decreases costly training errors, in the employment of a "bad" supervisor agent. FIG. 8C shows the effect between "good" and "bad" supervisor agent. A visual inspection of FIG. 8C shows that the choice of a "good" supervisor agent increases the benefits of the embodiments, as discussed herein.

Illustrative Computing Device

Having described embodiments of the present invention, an example operating environment in which embodiments of the present invention may be implemented is described below in order to provide a general context for various aspects of the present invention. Referring to FIG. 9, an illustrative operating environment for implementing embodiments of the present invention is shown and designated generally as computing device 900. Computing device 900 is but one example of a suitable computing environment and is not intended to suggest any limitation as to the scope of use or functionality of the invention. Neither should the computing device 900 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a smartphone or other handheld device. Generally, program modules, or engines, including routines, programs, objects, components, data structures, etc., refer to code that perform particular tasks or implement particular abstract data types. Embodiments of the invention may be practiced in a variety of system configurations, including hand-held devices, consumer electronics, general-purpose computers, more specialized computing devices, etc. Embodiments of the invention may also be practiced in distributed computing environments where tasks are performed by remote-processing devices that are linked through a communications network.

With reference to FIG. 9, computing device 900 includes a bus 910 that directly or indirectly couples the following devices: memory 912, one or more processors 914, one or more presentation components 916, input/output ports 918, input/output components 920, and an illustrative power supply 922. Bus 910 represents what may be one or more busses (such as an address bus, data bus, or combination thereof). Although the various blocks of FIG. 9 are shown with clearly delineated lines for the sake of clarity, in reality, such delineations are not so clear and these lines may overlap. For example, one may consider a presentation component such as a display device to be an I/O component, as well. Also, processors generally have memory in the form of cache. We recognize that such is the nature of the art, and reiterate that the diagram of FIG. 9 is merely illustrative of an example computing device that can be used in connection with one or more embodiments of the present disclosure. Distinction is not made between such categories as "workstation," "server," "laptop," "hand-held device," etc., as all are contemplated within the scope of FIG. 9 and reference to "computing device."

Computing device 900 typically includes a variety of computer-readable media. Computer-readable media can be any available media that can be accessed by computing device 900 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 900. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 912 includes computer storage media in the form of volatile and/or nonvolatile memory. Memory 912 may be non-transitory memory. As depicted, memory 912 includes instructions 924. Instructions 924, when executed by processor(s) 914 are configured to cause the computing device to perform any of the operations described herein, in reference to the above discussed figures, or to implement any program modules described herein. The memory may be removable, non-removable, or a combination thereof. Illustrative hardware devices include solid-state memory, hard drives, optical-disc drives, etc. Computing device 900 includes one or more processors that read data from various entities such as memory 912 or I/O components 920. Presentation component(s) 916 present data indications to a user or other device. Illustrative presentation components include a display device, speaker, printing component, vibrating component, etc.

I/O ports 918 allow computing device 900 to be logically coupled to other devices including I/O components 920, some of which may be built in. Illustrative components include a microphone, joystick, game pad, satellite dish, scanner, printer, wireless device, etc.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

From the foregoing, it will be seen that this disclosure in one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in a limiting sense, and the scope of embodiments is defined by the appended claims and their equivalents.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

What is claimed is:

1. A computer-readable storage medium having instructions stored thereon that, when executed by a processor of a computing device, cause the computing device to perform operations comprising:

employing a first agent to provide real-time control of an object within an environment based on a combination of a learning signal generated by the first agent and a supervisor signal generated by a supervisor agent, wherein the supervisor signal is weighted by a supervisor coefficient;

accumulating training data over one or more iterations of the first agent providing real-time control of the object within the environment;

updating the supervisor coefficient;

training a second agent to provide simulated control of the object within the environment based on at least a portion of the accumulated training data and a combination of a pioneer signal generated by the second agent and the supervisor signal that is weighted by the updated supervisor coefficient; and updating the first agent based on the trained second agent.

2. The computer-readable storage medium of claim 1, wherein the operations further comprise:

updating a critic network based on the accumulated training data;

determining an actor-value function based on the critic network; and updating the first agent based on the actor-value function.

3. The computer-readable storage medium of claim 1, wherein at least the first agent and the second agent are implemented in deep neural networks.

4. The computer-readable storage medium of claim 1, wherein the operations further comprise:

employing the updated first agent to provide further real-time control the object within the environment, wherein the combination of the learning signal and the supervisor signal is weighted by the updated supervisor coefficient.

5. The one or more computer-readable storage media of claim 1, wherein the operations further comprise:

employing a learning policy of the first agent to generate the learning signal based on a current state of the environment;

employing a supervisor policy of the supervisor agent to generate the supervisor signal based on the current state of the environment;

selecting an action based on the combination of the learning signal and the supervisor signal;

causing the object to execute the action;

observing a transition from current state to a new state of the environment, wherein the transition from the current state to the new state is in response to the action executed by the object;

observing a reward in response to the action executed by the object; and including the current state, the action, the reward, and the new state as associated data within the accumulated training data.

6. The one or more computer-readable storage media of claim 1, wherein training the second agent includes comparing a difference between the combination of the pioneer signal and the supervisor signal and the combination of the learning signal and the supervisor signal, and wherein the combination of the learning signal and the supervisor signal is embedded within the accumulated training data.

7. The one or more computer-readable storage media of claim 1, wherein updating the supervisor coefficient includes decreasing a value of the supervisor coefficient.

* * * * *